(No Model.) 2 Sheets—Sheet 1.

C. H. SCHURIG & C. PRÜFER.
FLOWER POT.

No. 491,786. Patented Feb. 14, 1893.

Witnesses:
Theodor Steudel.
Paul Kirschke.

Inventors:
Carl Hermann Schurig & Carl Prüfer
per Gerson and Sachse
their Attorneys.

(No Model.) 2 Sheets—Sheet 2.

C. H. SCHURIG & C. PRÜFER.
FLOWER POT.

No. 491,786. Patented Feb. 14, 1893.

Witnesses:
Theodor Steudel.
Paul Kirschke.

Inventors:
Carl Hermann Schurig & Carl Prüfer
per Gerson and Sachs
Their Attorneys.

UNITED STATES PATENT OFFICE.

CARL HERMANN SCHURIG AND CARL PRÜFER, OF MÜGELN, GERMANY.

FLOWER-POT.

SPECIFICATION forming part of Letters Patent No. 491,786, dated February 14, 1893.

Application filed November 30, 1891. Serial No. 413,621. (No specimens.)

*To all whom it may concern:*

Be it known that we, CARL HERMANN SCHURIG and CARL PRÜFER, subjects of the Emperor of Germany, residing in Mügeln, in the Empire of Germany, have invented a new and useful Improvement in Flower-Pots, of which the following is a specification.

The object of this invention is an improved flower pot, which, instead of being placed on the ground or on some table or shelf is adapted to be hung to the wall.

Figure 1:
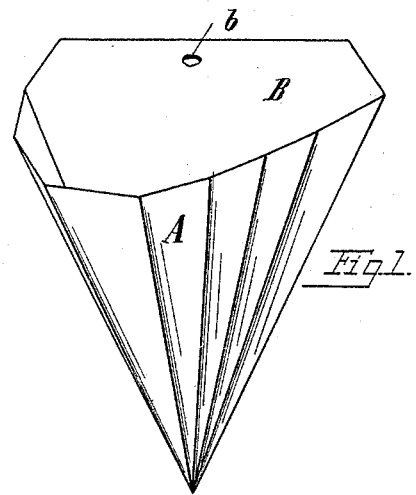
Figure 6:
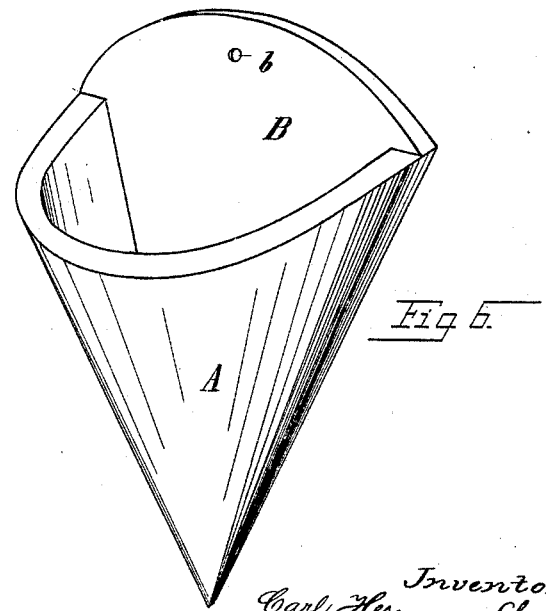
Figure 2:
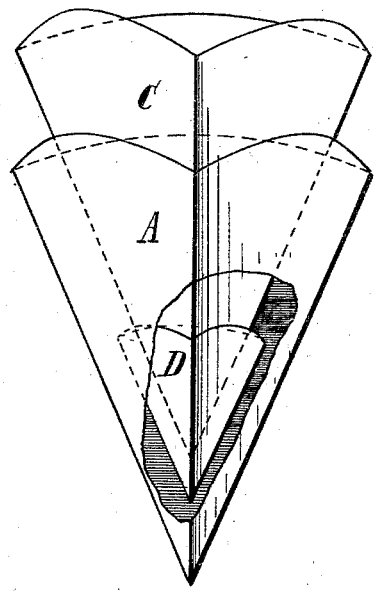
Figure 3:
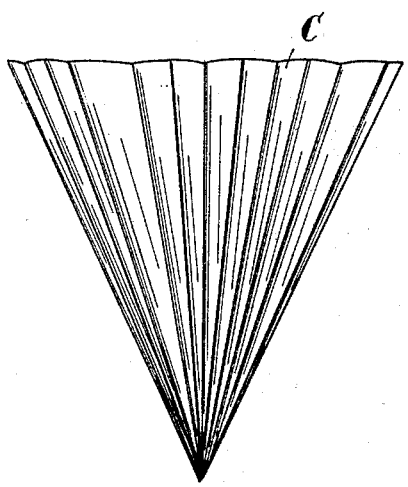
Figure 4:
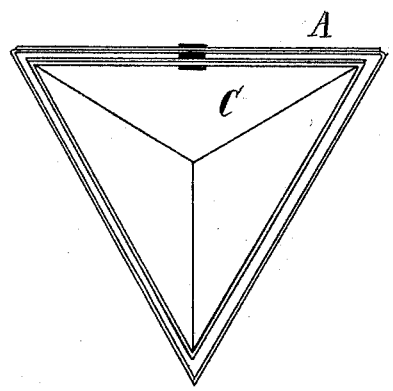
Figure 5:
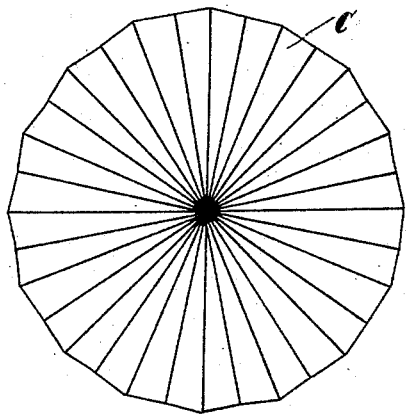

In the here-annexed drawings Figure 1 is a perspective view of a flower pot, Fig. 2 is the side view of the pot provided with an auxiliary pot, Fig. 3 is the plan of the same, Fig. 4 the side view and Fig. 5 the plan of an auxiliary pot of somewhat modified shape, Fig. 6 the perspective view of a modified flower pot.

The improved flower pot, which may be made of any suitable material has as it is shown by Figs. 1 to 6 of the drawings a body A tapering to a point downwardly, the rear side B of which body A has a hole or eye $b$ with which the flower pot is hung to a hook or nail fixed in the wall.

Flower pots of this kind are conveniently made from paste board and may have an auxiliary pot C of the same or other material to be placed into the main pot. Between the two pots A and C is inserted as is represented in side view by Fig. 2 and in plan by Fig. 3 a sheet metal pyramid or cap D at the bottom which serves to prevent water from flowing out and also to produce sufficient interstice between the two pots A and C. This latter purpose may also be accomplished by making the auxiliary pot C corrugated or ribbed. Such corrugated auxiliary pot C is shown by Fig. 4. in side view and in Fig. 5 in top-view.

What we claim is:

In a flower pot the combination of a body A tapering to a point with an auxiliary pot C and a cap D as and for the purpose set forth.

CARL HERMANN SCHURIG.
CARL PRÜFER.

Witnesses:
CARL BORNGRAEBER,
JULIUS WETTNICH.